(12) United States Patent
Kitahara et al.

(10) Patent No.: US 7,172,062 B2
(45) Date of Patent: Feb. 6, 2007

(54) FRICTION PLATE FOR WET TYPE MULTIPLATE CLUTCH

(75) Inventors: Shun Kitahara, Shizuoka (JP); Tomoyuki Miyazaki, Shizuoka (JP); Hiroaki Matsushima, Shizuoka (JP); Kazuyuki Fujita, Shizuoka (JP)

(73) Assignee: NSK-Warner Kabushiki Kaisha, Tokyo (JP)

( * ) Notice: Subject to any disclaimer, the term of this patent is extended or adjusted under 35 U.S.C. 154(b) by 105 days.

(21) Appl. No.: 10/929,723

(22) Filed: Aug. 31, 2004

(65) Prior Publication Data

US 2005/0109576 A1    May 26, 2005

(30) Foreign Application Priority Data

Sep. 1, 2003    (JP)    ............ P.2003-308212

(51) Int. Cl.
*F16D 13/74*    (2006.01)
(52) U.S. Cl. .............. 192/107 R; 192/70.12; 192/113.36
(58) Field of Classification Search ............ 192/113.36
See application file for complete search history.

(56) References Cited

U.S. PATENT DOCUMENTS

| | | | |
|---|---|---|---|
| 3,048,250 A * | 8/1962 | Kershner ............... | 192/107 R |
| 4,287,978 A * | 9/1981 | Staub, Jr. .............. | 192/113.36 |
| 5,094,331 A | 3/1992 | Fijimoto et al. | |
| 5,975,260 A * | 11/1999 | Fischer et al. ......... | 192/113.36 |
| 6,035,991 A * | 3/2000 | Willwerth et al. ...... | 192/107 R |
| 6,247,568 B1 * | 6/2001 | Takashima et al. ...... | 192/70.12 |
| 6,499,579 B2 * | 12/2002 | Ono et al. ............. | 192/113.36 |
| 6,557,685 B2 * | 5/2003 | Hattori ................. | 192/703.12 |
| 7,073,650 B2 * | 7/2006 | Fabricius et al. ...... | 192/113.36 |

FOREIGN PATENT DOCUMENTS

| | | |
|---|---|---|
| JP | 50-30145 U | 4/1975 |
| JP | 1-146019 U | 10/1989 |

* cited by examiner

*Primary Examiner*—Rodney H. Bonck
(74) *Attorney, Agent, or Firm*—Sughrue Mion, PLLC

(57) ABSTRACT

A friction plate for a wet type multiplate clutch has a substantially ring-shaped core plate and a friction member attached to the core plate. The friction member has a surface which includes a passage formed on a surface of the friction member, the passage extending from an inner peripheral edge of the friction member to an outer peripheral edge of the friction member, and a groove having an opened end which opens to the inner peripheral edge of the friction member and a closed end which is closed at a middle of the surface of the friction member. A width of the groove decreases towards a direction to the outer peripheral edge from the inner peripheral edge of the friction member.

6 Claims, 9 Drawing Sheets

Prior Art

FRICTION PLATE FOR WET TYPE MULTIPLATE CLUTCH

The present invention claims foreign priority to Japanese patent application no. P.2003-308212, filed on Sep. 1, 2003, the contents of which is incorporated herein by reference.

BACKGROUND OF THE INVENTION

1. Field of the Invention

The present invention relates to a friction plate for a wet type multiplate clutch, which can reduce drag torque and improve frictional properties between the friction plate and a separator plate of the clutch.

2. Description of the Related Art

FIG. 1 is a cross-sectional side view showing abasic structure of a wet type multiplate clutch 10. In FIG. 1, the wet type multiplate clutch 10 includes a clutch case 20, a piston 30, a center shaft 40, a separator plate 50 and a friction plate 60. A spline groove 21 is formed on the clutch case 20 and is spline-engaged with the separator plate 50. Also, spline teeth 22 are formed on the clutch case 20 and are spline-engaged with the center shaft 40. The separator plate 50 and the friction plate 60 are arranged alternately so that they can be engaged or disengaged with each other, and the friction plate 60 is spline-engaged with a hub (not shown). When the clutch is engaged, hydraulic fluid enters an operating chamber 25 via an oil hole 41 of the center shaft 40 and an oil hole 23 of the clutch case 20 to thereby press the piston 30 to the right direction in FIG. 1. A piston head 31 of the piston 30 presses the separator plate 50 and friction plate 60 towards a stopper ring 24 to thereby engage the clutch. Line X-X indicates a center axis of the center shaft 40.

When the clutch is disengaged by releasing the hydraulic fluid from the operating chamber 25, the piston 30 returns to the left direction in FIG. 1 due to the return force of a return spring 34. The return spring 34 is supported by spring support 35 and a stopper ring 36 is attached to the clutch case 30 as a stopper for the spring support 35. O-rings 32, 33 are provided between the clutch case 20 and the piston 30, respectively. Further, seal members 42, 43 are provided between the clutch case 20 and the center shaft 40.

FIG. 10 shows the first conventional example of the friction plate used for the wet type multiplate clutch. In the friction plate 60, a friction member 62 is attached to a surface of a core plate 61. It is required for the friction plate 60 to reduce the drag torque and to improve cooling capability. Accordingly, an oil passage 63 and an oil groove 64 are formed on the friction plate so that they are arranged alternately as shown in FIG. 10. Note that the oil passage 63 extends outwardly in a direction from an inner peripheral edge 73 to an outer peripheral edge 74 of the friction member 62 with a constant width. The oil groove 64 opens to the inner peripheral edge 73 and closes at a middle of a surface of the friction member 62, and a width thereof is constant. Spline teeth 75 are formed on an inner puerperal edge of the core plate 61.

In the second conventional example as shown in FIG. 11, the oil groove 64 is formed so that its width is larger than that of the oil groove 64 of the first conventional example. Further, U.S. Pat. No. 5,094,331, Japanese Utility Model Unexamined Publications JP-UM-A-1-146019 and JP-UM-A-50-30145 show that the width of the oil passage is formed so as to be decreased towards a direction of an outer peripheral edge to an outer peripheral edge.

It has been carried out to reduce the drag torque by forming oil passages or oil grooves, however, it is required further reduction of the drag torque. In addition, in the friction member having oil passages on its surface, it could reduce the drag torque, however, it tends to have high friction coefficient at an initial stage of a frictional engaging, accordingly, there occurs a problem of biting between the friction plate and the separator plate. Also, this biting depends on engaging pressure at the frictional engaging.

SUMMARY OF THE INVENTION

An object of the present invention is to provide a friction plate for a wet type multiplate clutch which can reduce the drag torque and improve the frictional properties between the friction plate and the separator plate of the clutch.

To achieve the above-mentioned object, according to a first aspect of the present invention, there is provided a friction plate for a wet type multiplate clutch, comprising:

a substantially ring-shaped core plate; and a friction member attached to the core plate, the friction member having a surface including;

a passage extending from an inner peripheral edge of the friction member to an outer peripheral edge of the friction member; and a groove having an opened end which opens to the inner peripheral edge of the friction member and a closed end which is closed at a middle thereof, wherein a width of the groove decreases towards a direction to the outer peripheral edge from the inner peripheral edge of the friction member.

According to a second aspect of the present invention according to the first aspect of the present invention, it is preferable that a width of the passage decreases towards the direction to the outer peripheral edge from the inner peripheral edge of the friction member.

According to a third aspect of the present invention, there is provided a friction plate for a wet type multiplate clutch, comprising:

a substantially ring-shaped core plate;

a friction member attached to the core plate; and a plurality of pairs of two passages formed on a friction surface of the friction member, the passage extending from an inner peripheral edge of the friction member to an outer peripheral edge of the friction member, wherein the two passages have bent portions at a middle portion of the friction member, respectively, and the two passages extend from the inner peripheral edge of the friction member to the bent portion at the middle portion of the friction member so as to approach each other and extend from the bent portion to the outer peripheral edge of the friction member so as to apart from each other.

According to a fourth aspect of the present invention according to the third aspect of the present invention, it is preferable that at least one pair of two passages has extended portions at the bent portions, respectively, and the extended portions extend from the bent portions so as to approach each other.

According to a fifth aspect of the present invention according to the third aspect of the present invention, it is more preferable that at least one pair of passages has a circumferential groove communicating bent portions.

According to a sixth aspect of the present invention according to the third aspect of the present invention, it is further suitable that the friction plate further includes:

a groove having an open end which opens to the inner peripheral edge of the friction member, and wherein a width of the groove decreases towards a direction to the outer peripheral edge from the inner peripheral edge of the friction member.

According to a seventh aspect of the present invention, there is provided a friction plate for a wet type multiplate clutch, comprising:

a substantially ring-shaped core plate; and a friction member attached to the core plate, the friction member having a surface including;

a passage formed on a surface of the friction member, the passage extending from an inner peripheral edge to an outer peripheral edge of the friction member; and a groove shaped into substantially triangle with three vertexes, wherein the two vertexes of the groove are disposed on an inner peripheral edge of the friction member and the other vertex is disposed at a middle portion of the friction member.

To achieve the object of the present invention, it is better to form the groove which gradually narrows its width towards the outer peripheral direction according to the first, second and sixth aspect of the present invention.

DETAILED DESCRIPTION OF THE PREFERRED EMBODIMENTS

Figure 1:
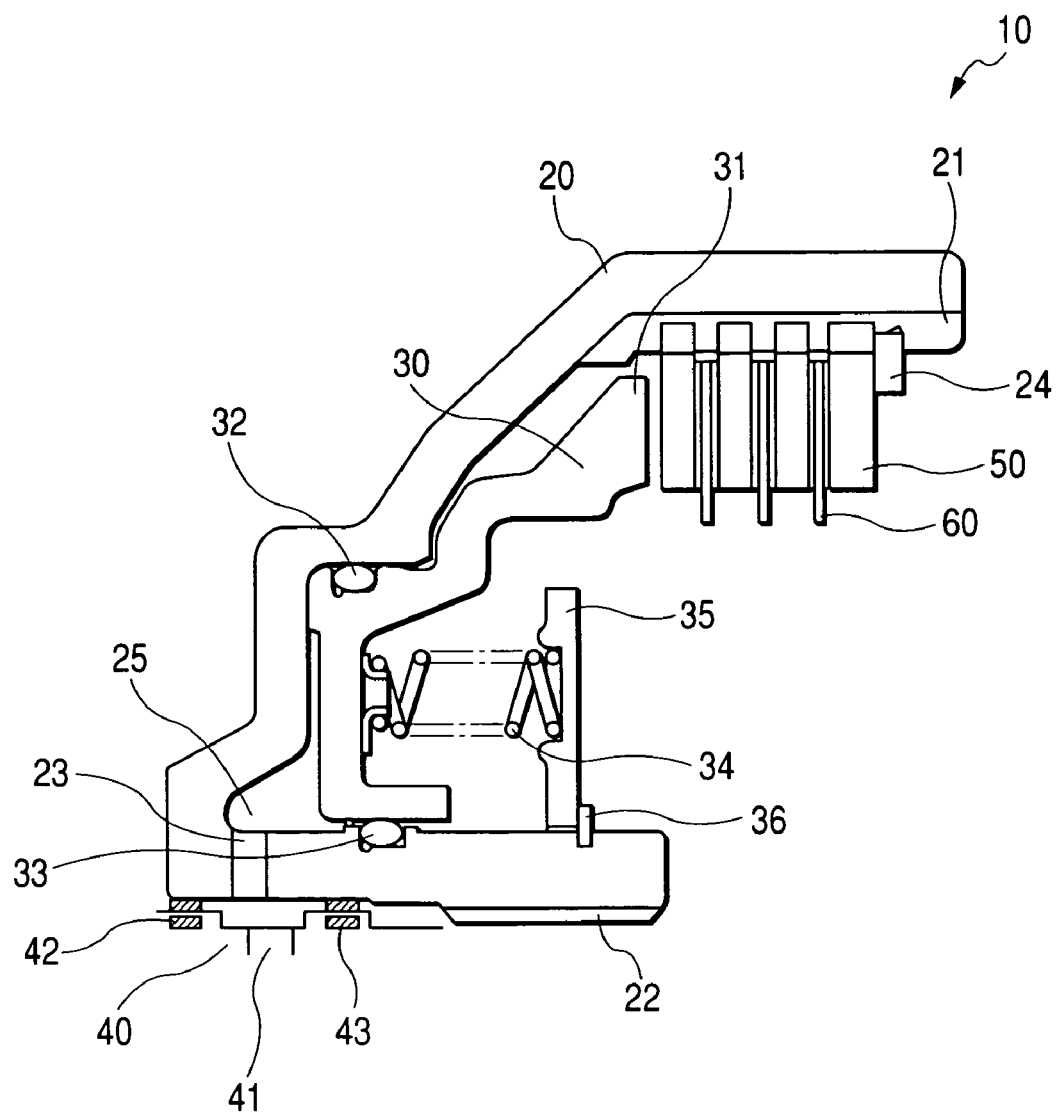
FIG. 1 is a cross sectional view showing a basic structure of a multiplate clutch.
Figure 2:
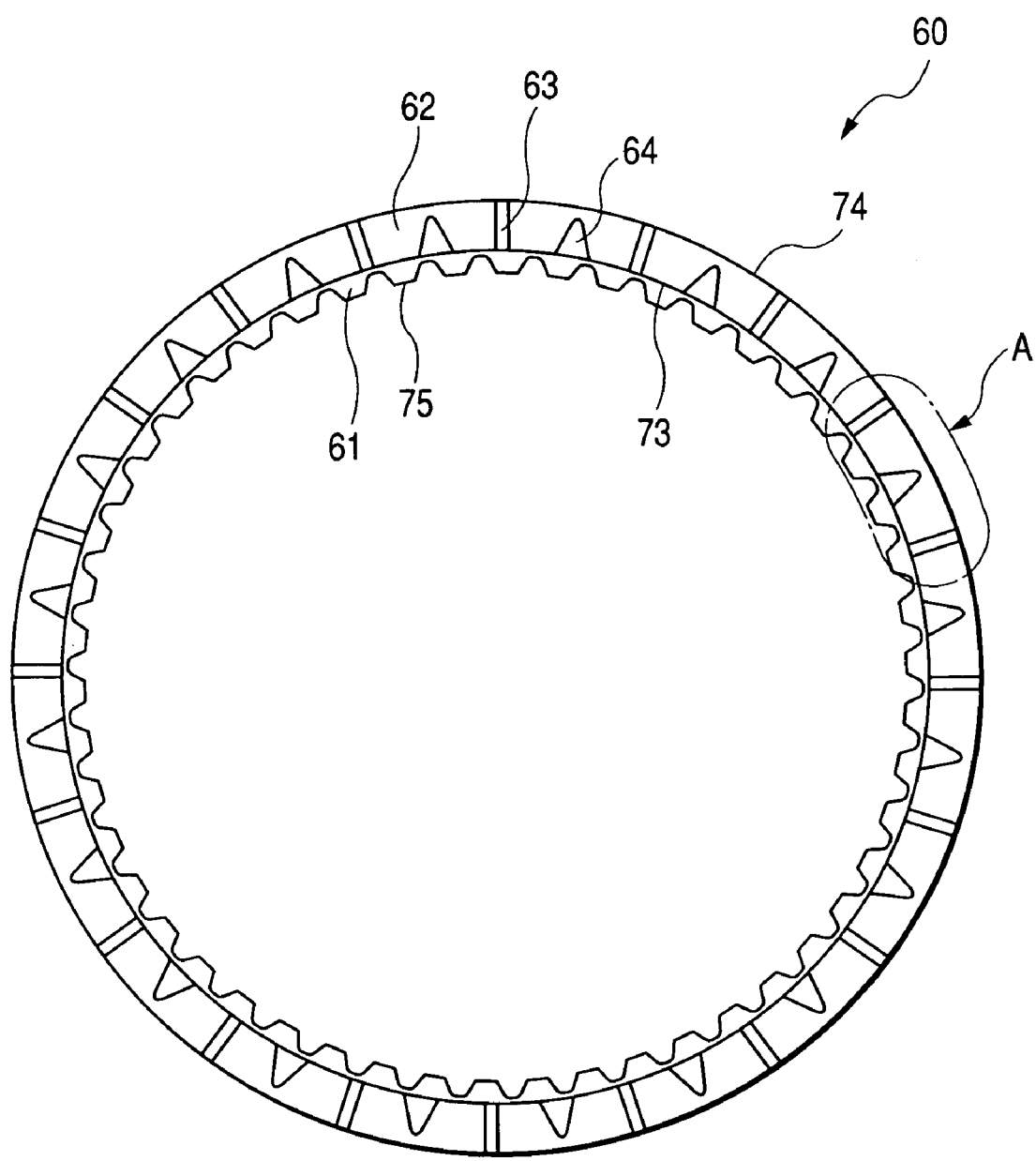
FIG. 2 is a front view showing a first embodiment of the present invention.
Figure 3:
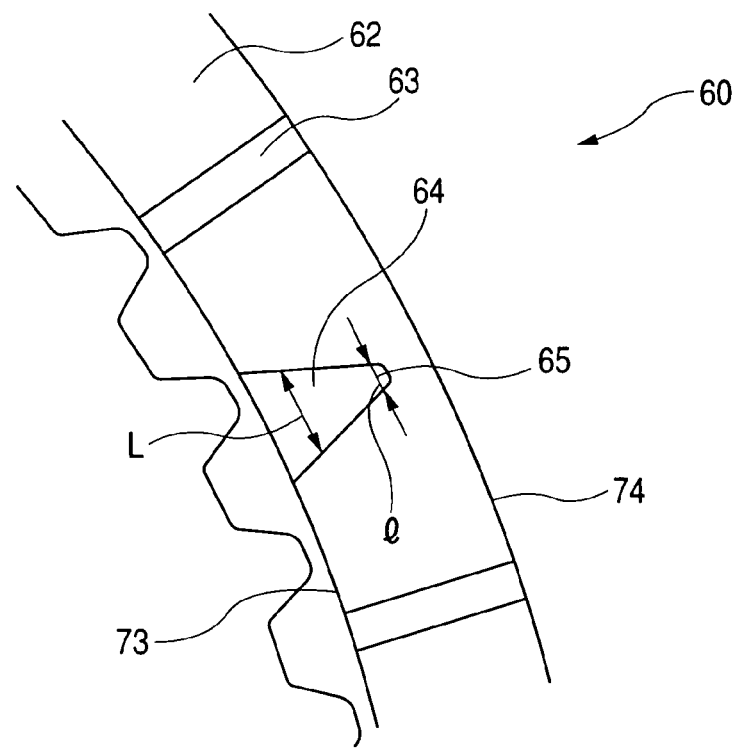
FIG. 3 is an enlarged view of part A in FIG. 2.

FIG. 2 is a front view showing the first embodiment of a friction plate 60 of the present invention, and FIG. 3 is an enlarged view showing part A in FIG. 2. The friction plate 60 is constituted in such a manner that a friction member 62 is attached on a substantially ring-shaped core plate 61. Spline teeth 75 are formed on an inner peripheral edge of the core plate 61 and spline-engaged with an opposed member to transmit torque from the center shaft to the hub. An oil passage 63 and an oil groove 64 are formed on the friction member 62. The oil passage 63 extends outwardly from an inner peripheral edge 73 to an outer peripheral edge 74 of the friction member 62. The oil groove 64 has an opening end portion which opens to the inner peripheral edge 73 and has a closed end portion 65 on a friction surface of the friction member 62. As shown in FIG. 3 clearly, the oil groove 64 is formed in such a manner that a width 1 at the closed end portion 65 is smaller than a width L at the opening end portion, and the width gradually decreases towards a direction to the outer peripheral edge from the inner peripheral edge.

Figure 4:
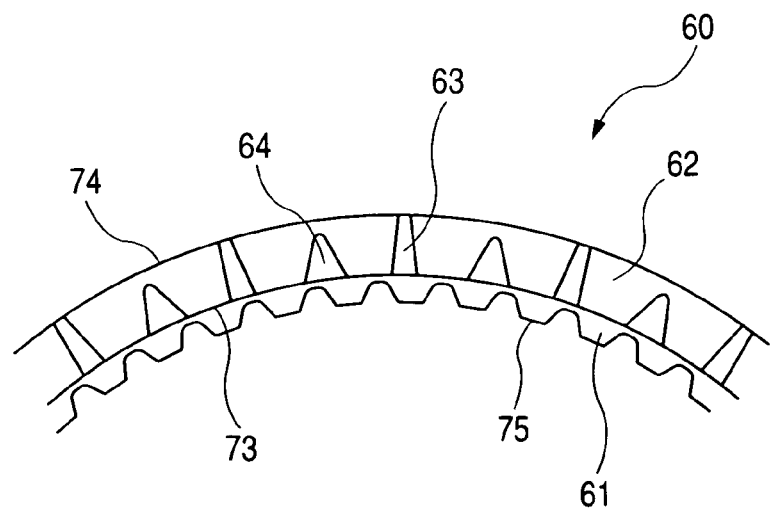
FIG. 4 is a view showing a second embodiment of the present invention.

FIG. 4 shows the second embodiment of the present invention. In the second embodiment of the present invention, in addition to the structure of the first embodiment, an oil passage 63 is also formed so as to gradually narrow its width towards the direction to the outer peripheral edge 74 from inner peripheral edge 73. In both of the first and second embodiments, the oil passage 63 and the oil groove 64 are arranged alternately along a circumferential direction of the friction member 62.

Due to the above described structure, in the case where lubricating oil is subject to centrifugal force caused by the rotation of the friction plate, the force applied to the lubricating oil increases when the lubricating oil is pressed out from the groove, accordingly force for separating the separator plate from the friction plate increases. Especially, this effect is occurred by the oil groove which opens to the inner peripheral edge, has the closed end portion on the surface of the friction member and is formed so as to gradually narrow its width towards the direction to the outer peripheral edge from the inner peripheral edge as shown in the first and second embodiments of the present invention.

Figure 5:
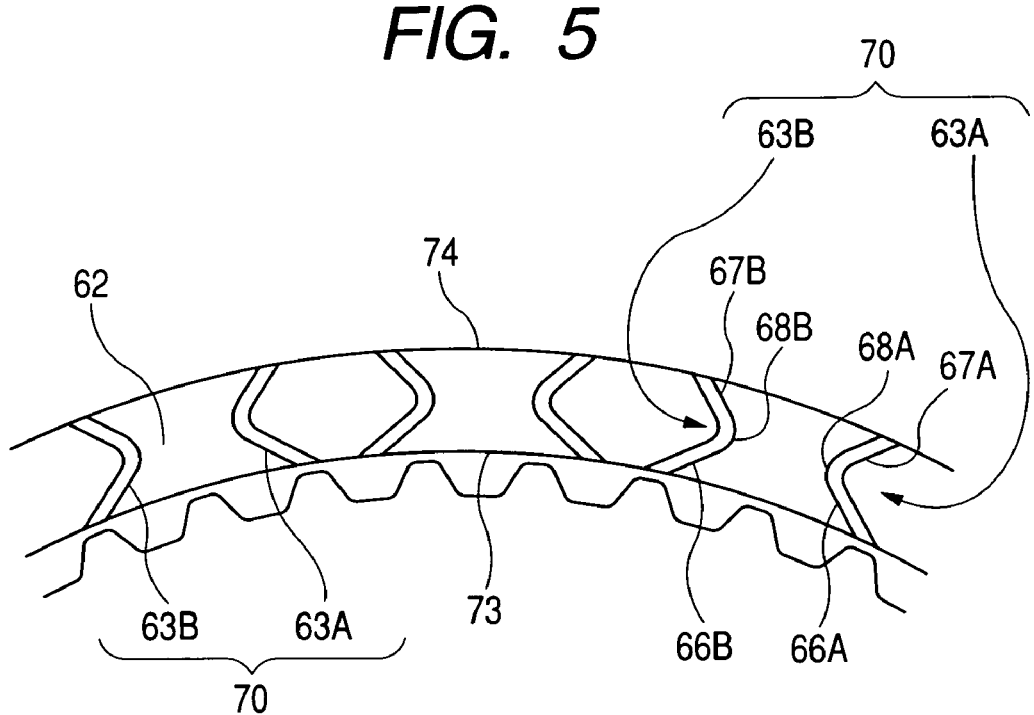
FIG. 5 is a view showing a third embodiment of the present invention.

In the third embodiment as shown in FIG. 5, the friction plate is structured in such a manner that a plurality of pairs of two oil passages are provided on the friction member 62. Each of the pair of two oil passages has a bent portion at a middle portion of the friction surface of the friction member 62, and the two oil passages approach each other fron the inner peripheral edge of the friction member 62 to the bent portion at the middle portion of the friction surface, and then apart from each other from the bent portion at the middle portion to the outer peripheral edge of the friction member 62.

In other words, in FIG. 5, portions 66A, 66B, which are defined between the inner peripheral edge 73 and the bent portion 68A, 68B at the middle portion of the friction surface of the two oil passages 63A, 63B, are extended so as to approach each other, and portions 67A, 67B which are defined between the bent portions 68A, 68B at the middle portion and the outer peripheral edge 74 are extended and inclined so as to apart from each other. That is, the two oil passages 63A, 63B are dogleg-shape such as "<" and ">", respectively, and are provided so that the bent portions 68A, 68B approach each other so as to form "><" shape. The two oil passages 63A, 63B form the pair 70 of oil passages.

Figure 6:
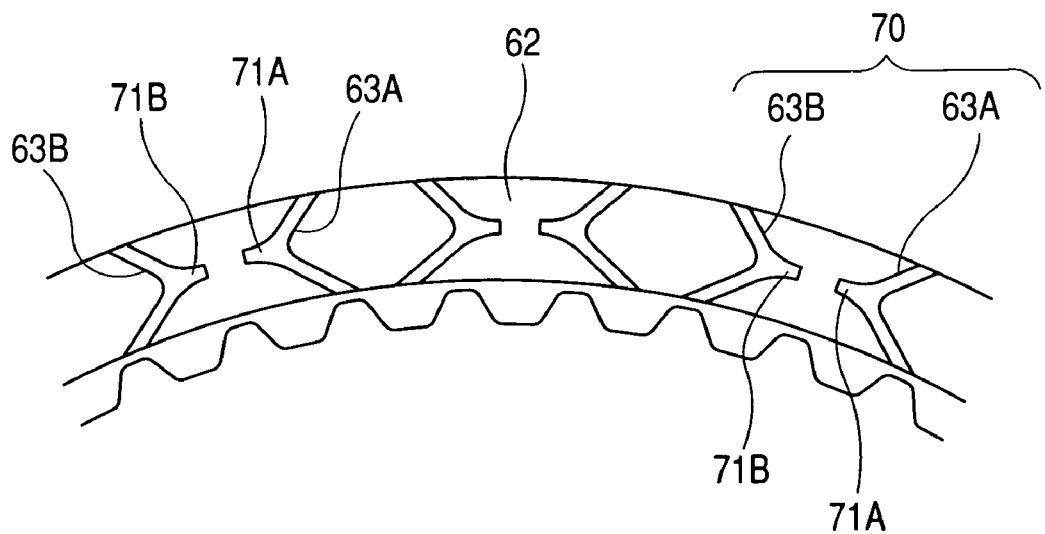
FIG. 6 is a view showing a fourth embodiment of the present invention.

FIG. 6 shows the fourth embodiment of the present invention. In addition to the structure of the third embodiment, the two oil passages 63A, 63B have circumferential extended portions 71A, 71B which extend from the respective bent portions 68A, 68B in the circumferential direction of the friction member 62 in such a manner that they are opposed to each other.

Figure 7:
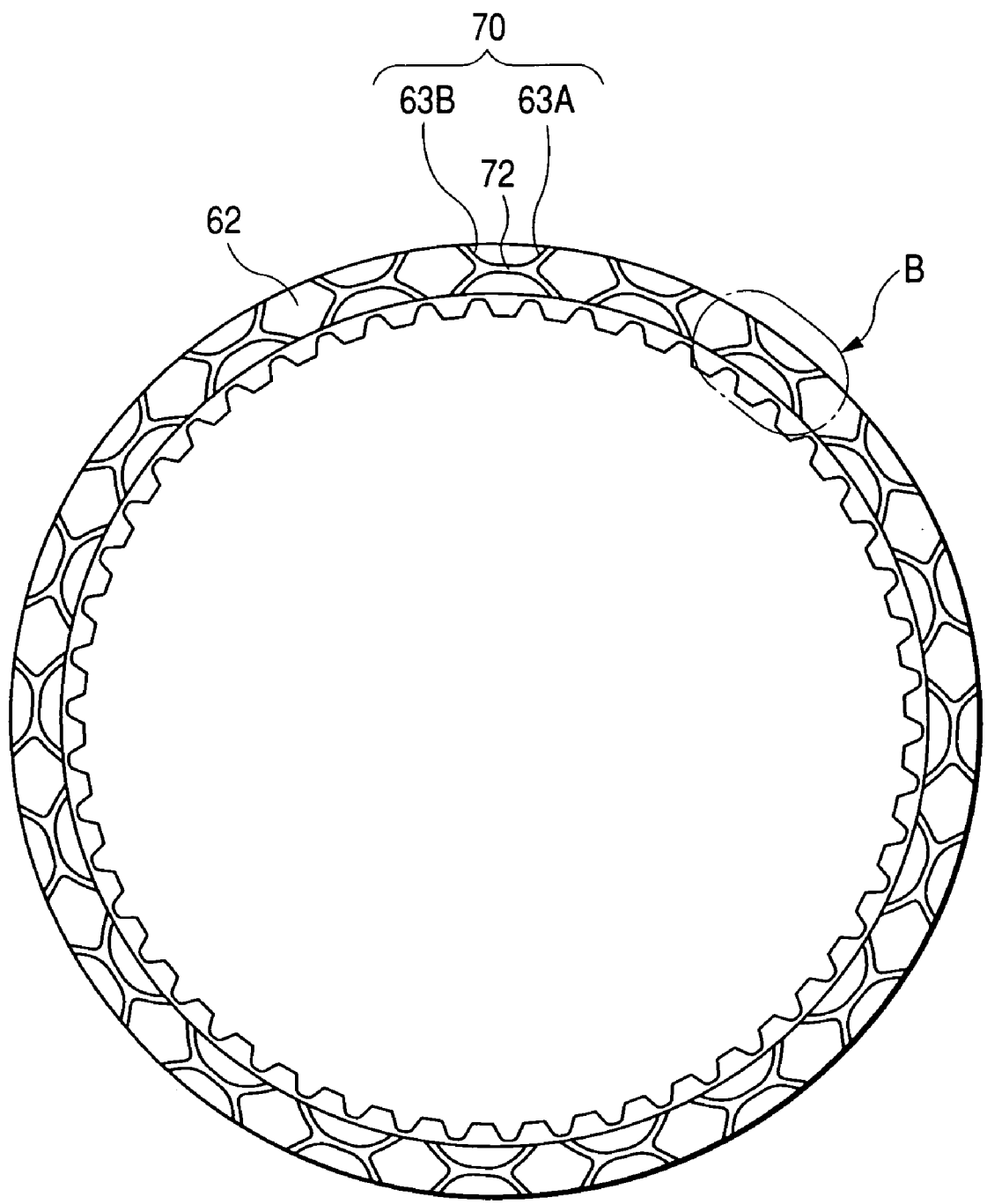
FIG. 7 is a view showing a fifth embodiment of the present invention.
Figure 8:
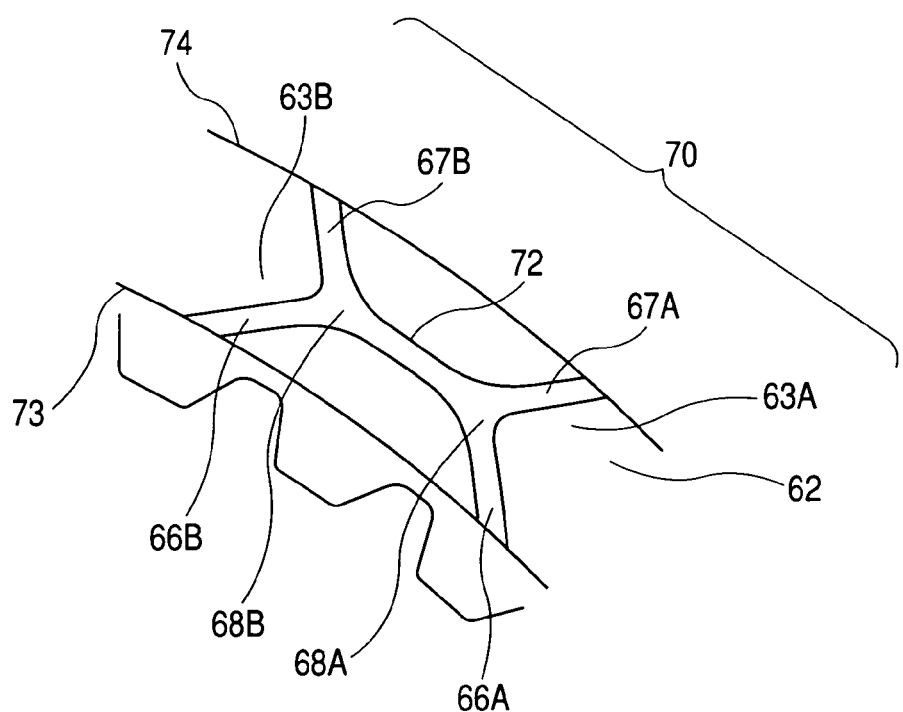
FIG. 8 is an enlarged view showing part B in FIG. 7.

FIG. 7 shows the fifth embodiment of the present invention, and FIG. 8 is an enlarged view showing part B in FIG. 7. In addition to the structure of the third embodiment shown in FIG. 5, the two oil passages 63A, 63B have a circumferential groove 72 which communicates with the bent portions 68A, 68B and extends in the circumferential direction of the friction member 62.

Figure 9:
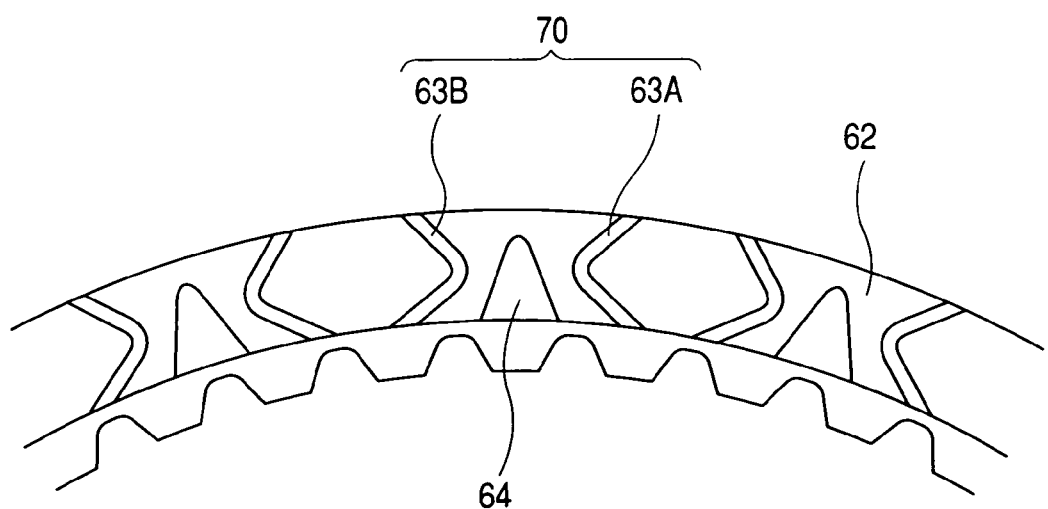
FIG. 9 is a view showing a sixth embodiment of the present invention.

FIG. 9 shows the sixth embodiment of the present invention, in addition to the structure of the third embodiment, there is formed an oil groove 64 which opens to the inner peripheral edge of the friction member 62 and gradually narrow its width towards the direction to the outer peripheral edge.

According to the dogleg-shaped oil passage as shown in FIG. 5 to FIG. 9, the lubricating oil which is subject to the centrifugal force caused by the rotation of the friction plate hits the bent portion at the middle of the oil passage, and then the lubricating oil is pressed out from the oil passage in an axial direction of the center shaft, accordingly, an operation separating from the separator plate of the friction plate is occurred. This operation is increased by the combination of the circumferential extended portion, the circumferential groove or the oil groove which narrows its width gradually.

Figure 10:
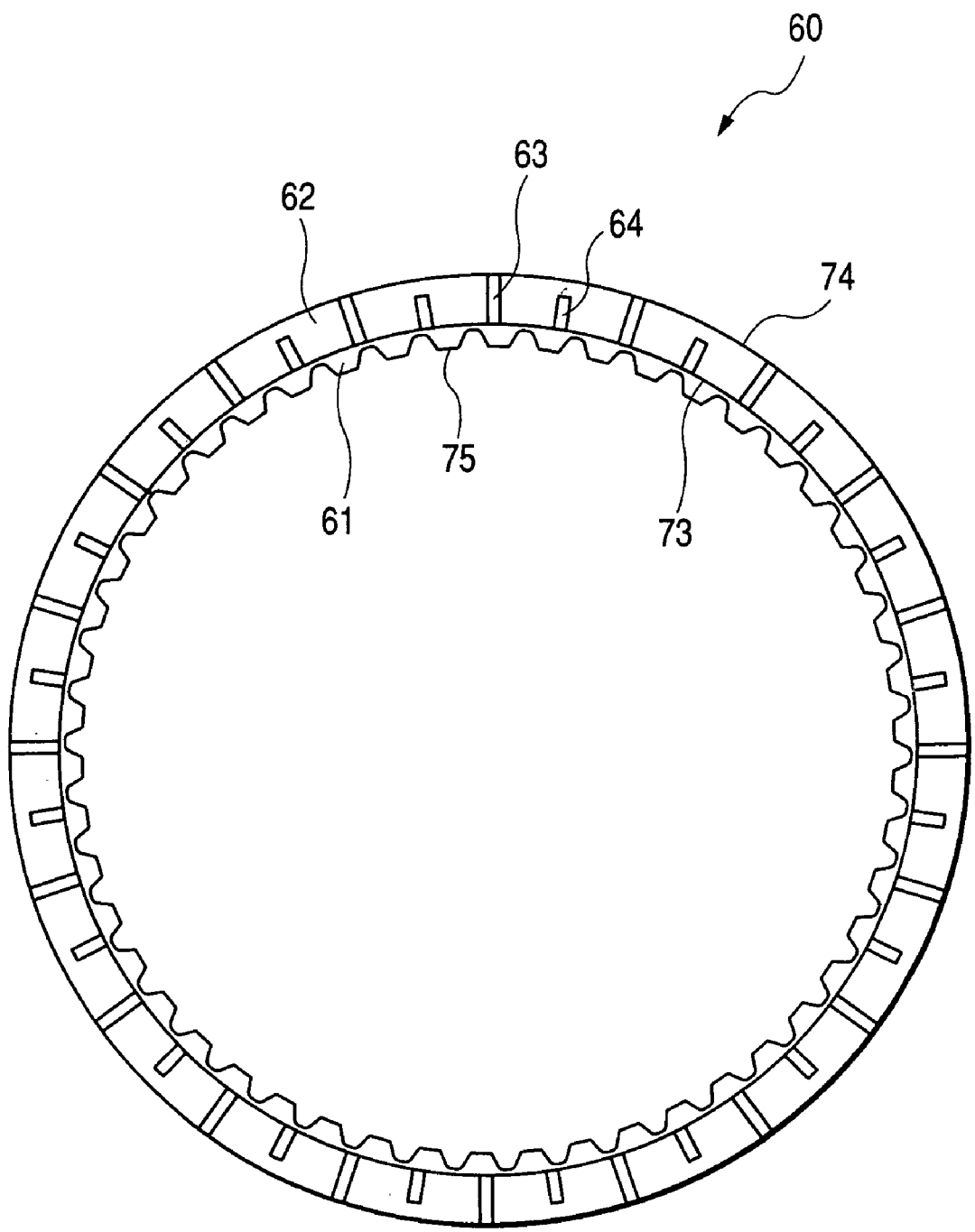
FIG. 10 is a view showing the first conventional example.
Figure 11:
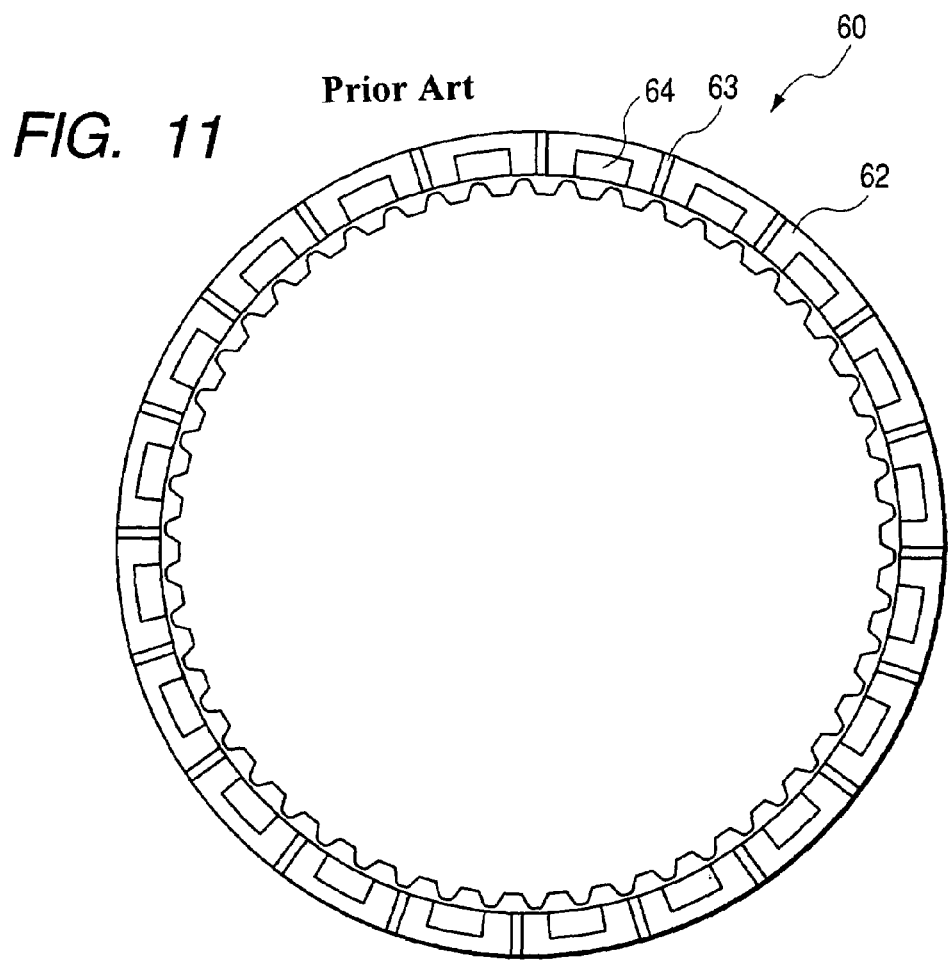
FIG. 11 is a view showing the second conventional example.

Results of the comparative test of the drag torque and the initial friction coefficient among the comparative examples 1, 2 and embodiments of the present invention will be described below. Wherein the comparative example 1 represents the above-described conventional example 1 as shown in FIG. 10, and the comparative example 2 is the above-described conventional example 2 as shown in FIG. 11.

Comparative Test of the Drag Torque a Test Condition is:

| oil temperature | 40° C. |
|---|---|
| flow rate of the lubricant oil | 0.4 l/min. |
| number of friction surface | 8 |
| clearance | 0.2 mm/plate |
| inner diameter | Φ142 |
| outer diameter | Φ159 |
| friction area | 40.19 cm² (in total) about 32 cm² (except groove area) |

Wherein the friction surface is a surface defined between the friction plate and the separator plate 50, the clearance is defined between the friction plate 60 and the separator plate 50, and inner and outer diameter are diameters of the friction plate.

Figure 12:
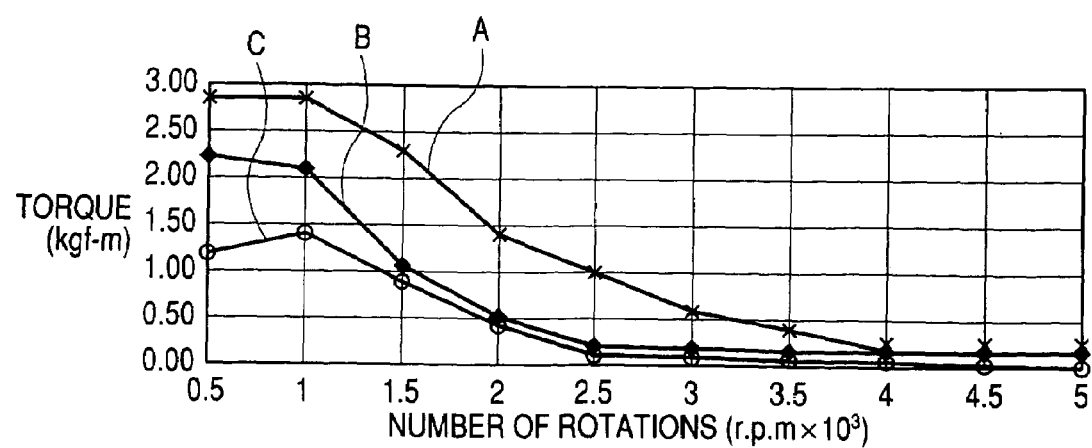
FIG. 12 is a view showing a test result of the drag torque.
Figure 13:
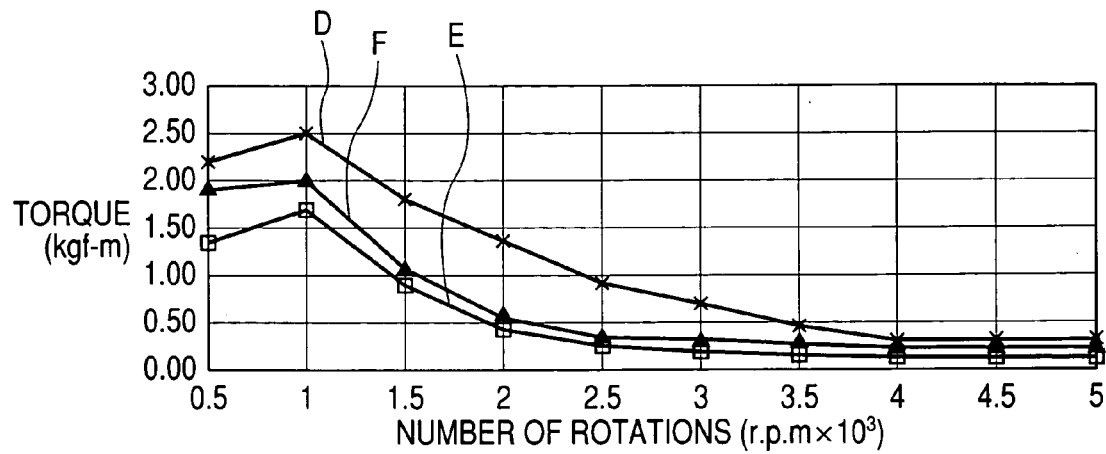
FIG. 13 is a view showing another test result of the drag torque.

FIG. 12 is a graph which a vertical axis indicates torque (kgf-m) and a horizontal axis indicates number of rotations. Line A denotes comparative example 1, line B denotes the fifth embodiment and line C denotes the sixth embodiment. FIG. 13 shows another result of FIG. 12, line D denotes the comparative example 2, line E denotes the second embodiment and the line F denotes the third embodiment. As a test result, a group of the third, fourth and fifth embodiments show similar common result and another group of the first, second and six embodiments show another similar common result.

Comparative Test of the Initial Friction Coefficient a Test Condition is;

| number of rotations | 3600 r.p.m. |
|---|---|
| inertial mass | 0.294 kg-m² |
| surface pressure (MPa) | 0.1, 0.2, 0.41, and 0.82 |
| oil temperature | 40° C. |
| flow rate | 0.3 l/min. |
| number of friction member | 3 |
| inner diameter | Φ142 |
| outer diameter | Φ159 |

-continued

| friction area | 40.19 cm² (in total) about 32 cm² (except groove area) |
|---|---|

Wherein the surface pressure is pressure applied to the surface of the friction plate 60.

Figure 14:
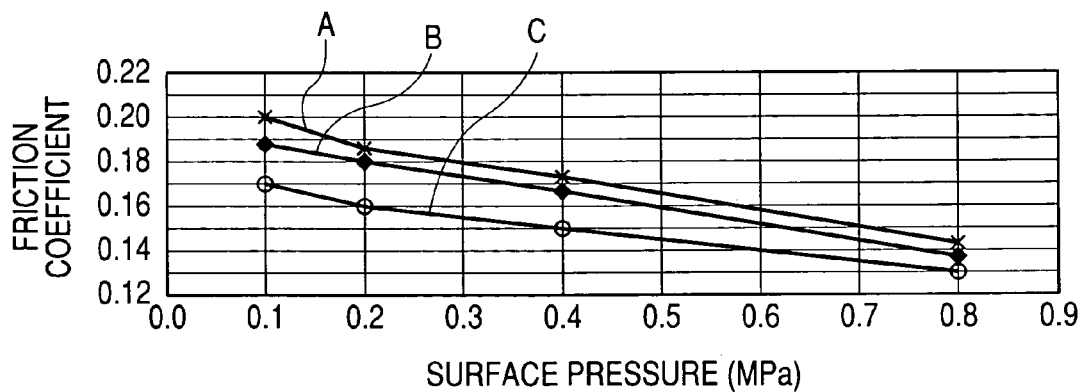
FIG. 14 is a view showing a test result of the friction coefficient.
Figure 15:
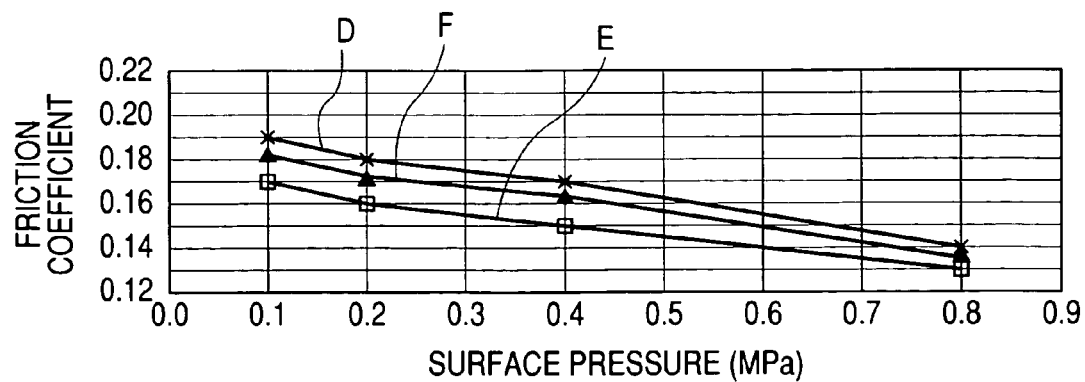
FIG. 15 is a view showing another test result of the friction coefficient.

FIG. 14 is a graph which a vertical axis indicates friction coefficient and a horizontal axis indicates surface pressure applied to the surface of the friction plate. Line A denotes comparative example 1, line B denotes the fifth embodiment and line C denotes the sixth embodiment. FIG. 15 shows another result of FIG. 14, line D denotes the comparative example 2, line E denotes the second embodiment and the line F denotes the third embodiment. As a test result, a group of the third, fourth and fifth embodiments show similar common result and another group of the first, second and six embodiments show another similar common result.

While there has been described in connection with the preferred embodiments of the present invention, it will be obvious to those skilled in the art that various changes and modification may be made therein without departing from the present invention, and it is aimed, therefore, to cover in the appended claim all such changes and modifications as fall within the true spirit and scope of the present invention.

According to the above-mentioned present invention, it is achieved to reduce the drag torque and to keep the low initial friction coefficient at frictional engaging and reduce the variation of the friction coefficient in accordance with the engaging pressure.

What is claimed is:

1. A friction plate for a wet type multiplate clutch, comprising:
   a substantially ring-shaped core plate;
   a friction member attached to the core plate; and
   a pair of non-merging passages formed on a friction surface of the friction member, each passage extending from an inner peripheral edge of the friction member to an outer peripheral edge of the friction member,
   wherein each passage of the pair of passages have a single bent portion at a middle portion of the friction member, and
   each passage of the pair of passages extend from the inner peripheral edge of the friction member to the bent portion at the middle portion of the friction member so as to approach each other and extend from the bent portion to the outer peripheral edge of the friction member so as to extend away from each other.

2. The friction plate for a wet type multiplate clutch as set forth in claim 1, further including:
   a groove having an open end which opens to the inner peripheral edge of the friction member, and
   wherein a width of the groove decreases towards a direction to the outer peripheral edge from the inner peripheral edge of the friction member.

3. The friction plate for a wet type mutiplate clutch according to claim 1, wherein each passage passes entirely through a portion of the friction member to the side of a radial line that extends from a ring center of the ring shaped core plate and immediately adjacent to a side of the inner peripheral edge of each passage,
   wherein the ring center is located inside the inner peripheral edge and is equidistant from the inner peripheral edge.

4. The friction plate for a wet-type multiplate clutch according to claim 1, wherein there is not any completely straight radial line that can extend through the passage from the inner peripheral edge to the outside peripheral edge.

5. A friction plate for a wet type multiplate clutch, comprising:
- a substantially ring-shaped core plate;
- a friction member attached to a core plate; and
- a pair of passages formed on a friction surface of the friction member, each passage extending from an inner peripheral edge of the friction member to an outer peripheral edge of the friction member,
- wherein each passage of the pair of passages have a bent portion at a middle portion of the friction member, and each passage of the pair of passages extend from the inner peripheral edge of the friction member to the bent portion at the middle portion of the friction member so as to approach each other and extend from the bent portion to the outer peripheral edge of the friction member so as to extend away from each other,
- wherein each of the pair of passages has an extended portion at the bent portion that extends from the bent portion so as to approach the other bent portion of the pair of passages.

6. The friction plate for a wet type multiplate clutch as set forth in claim 5, wherein the pair of passages has a circumferential groove communicating bent portions.

* * * * *